(12) United States Patent
Noelting et al.

(10) Patent No.: US 10,332,137 B2
(45) Date of Patent: Jun. 25, 2019

(54) PROFICIENCY-BASED PROFILING SYSTEMS AND METHODS

(71) Applicant: Qwalify Inc., Kitchener (CA)

(72) Inventors: Philippe Noelting, Kitchener (CA); Avery Abramovitch, Saint-Lazare (CA)

(73) Assignee: Qwalify Inc., Kitchener (CA)

( * ) Notice: Subject to any disclaimer, the term of this patent is extended or adjusted under 35 U.S.C. 154(b) by 0 days.

(21) Appl. No.: 15/349,764

(22) Filed: Nov. 11, 2016

(65) Prior Publication Data

US 2018/0137527 A1 May 17, 2018

(51) Int. Cl.
G06Q 30/02 (2012.01)
G06Q 30/00 (2012.01)

(52) U.S. Cl.
CPC ..... G06Q 30/0204 (2013.01); G06Q 30/0203 (2013.01)

(58) Field of Classification Search
USPC ........................................................ 705/7.14
See application file for complete search history.

(56) References Cited

U.S. PATENT DOCUMENTS

| | | | | |
|---|---|---|---|---|
| 6,438,580 B1 * | 8/2002 | Mears | ..................... | G06Q 10/10 709/204 |
| 7,367,808 B1 * | 5/2008 | Frank | ..................... | G06Q 10/06 434/219 |
| 7,451,094 B2 * | 11/2008 | Royall, Jr. | ............. | G06Q 10/10 705/326 |
| 7,529,693 B2 * | 5/2009 | Basak | ..................... | G06Q 30/02 705/26.8 |
| 7,555,441 B2 * | 6/2009 | Crow | ................. | G06Q 10/0631 705/7.14 |
| 7,593,861 B2 * | 9/2009 | Morrel-Samuels | ......................... | G06Q 10/0639 705/7.38 |

(Continued)

FOREIGN PATENT DOCUMENTS

| | | | | |
|---|---|---|---|---|
| WO | WO-03081381 A2 * | 10/2003 | ..... | G06Q 10/063112 |
| WO | WO-2005096750 A2 * | 10/2005 | ........... | G06F 17/241 |

(Continued)

OTHER PUBLICATIONS

Sieg, Ahu, Bamshad Mobasher, and Robin D. Burke. "Learning ontology-based user profiles: A semantic approach to personalized web search." IEEE Intelligent Informatics Bulletin 8.1 (2007): 7-18. (Year: 2007).*

(Continued)

*Primary Examiner* — Thomas L Mansfield
*Assistant Examiner* — Derick J Holzmacher
(74) *Attorney, Agent, or Firm* — Carr & Ferrell LLP (57) ABSTRACT

Systems and methods that provide proficiency-based profiling and matching are provided herein. An example method includes providing a series of questions to a plurality of individuals related to a plurality of segments using data reference structures generated from subject matter information, receiving answers to a series of questions from the plurality of individuals, the answers being indicative of a proficiency level of an individual, building a profile for each of the plurality of individuals using the elicited information based on one or more unique subject matter domains.

20 Claims, 8 Drawing Sheets

(56) References Cited

U.S. PATENT DOCUMENTS

| | | | | |
|---|---|---|---|---|
| 7,827,125 | B1* | 11/2010 | Rennison | G06F 16/319 |
| | | | | 706/14 |
| 8,620,909 | B1* | 12/2013 | Rennison | G06F 17/3066 |
| | | | | 707/722 |
| 2001/0037317 | A1* | 11/2001 | Freiwirth | G06Q 20/383 |
| | | | | 705/74 |
| 2001/0049674 | A1 | 12/2001 | Talib | |
| 2002/0032600 | A1* | 3/2002 | Royall, Jr. | G06Q 10/10 |
| | | | | 705/326 |
| 2002/0042786 | A1* | 4/2002 | Scarborough | G06Q 10/063 |
| | | | | 706/21 |
| 2002/0128892 | A1* | 9/2002 | Farenden | G06Q 10/063112 |
| | | | | 705/7.14 |
| 2002/0128894 | A1* | 9/2002 | Farenden | G06Q 10/063112 |
| | | | | 705/7.14 |
| 2003/0182171 | A1* | 9/2003 | Vianello | G06Q 10/063112 |
| | | | | 705/7.14 |
| 2006/0235884 | A1* | 10/2006 | Pfenninger | G06Q 10/10 |
| 2006/0271421 | A1* | 11/2006 | Steneker | G06Q 10/063112 |
| | | | | 705/7.14 |
| 2006/0287764 | A1* | 12/2006 | Kraft | G06F 21/6245 |
| | | | | 700/236 |
| 2008/0033792 | A1* | 2/2008 | Rosner | G06Q 10/06 |
| | | | | 705/7.14 |
| 2008/0091686 | A1* | 4/2008 | Beard | G06Q 10/06 |
| 2008/0288271 | A1* | 11/2008 | Faust | G06Q 30/02 |
| | | | | 705/7.32 |
| 2009/0112678 | A1* | 4/2009 | Luzardo | G06N 5/02 |
| | | | | 705/7.38 |
| 2009/0182718 | A1* | 7/2009 | Waclawik | G06Q 30/0204 |
| 2009/0288018 | A1 | 11/2009 | Paliwal et al. | |
| 2010/0082691 | A1* | 4/2010 | Jaster | G06F 17/30734 |
| | | | | 707/792 |
| 2010/0205541 | A1 | 8/2010 | Rapaport et al. | |
| 2011/0053126 | A1* | 3/2011 | Bielenberg | G09B 29/106 |
| | | | | 434/219 |
| 2011/0055098 | A1* | 3/2011 | Stewart | G06Q 10/00 |
| | | | | 705/321 |
| 2011/0231329 | A1* | 9/2011 | Vianello | G01C 21/20 |
| | | | | 705/321 |
| 2011/0246920 | A1* | 10/2011 | Lebrun | G06Q 30/02 |
| | | | | 715/769 |
| 2011/0276507 | A1* | 11/2011 | O'Malley | G06Q 10/00 |
| | | | | 705/321 |
| 2012/0042263 | A1 | 2/2012 | Rapaport et al. | |
| 2012/0078804 | A1* | 3/2012 | Scarborough | G06Q 10/1053 |
| | | | | 705/321 |
| 2012/0078906 | A1* | 3/2012 | Anand | G06F 17/30702 |
| | | | | 707/737 |
| 2012/0214147 | A1* | 8/2012 | Ernst | G09B 7/00 |
| | | | | 434/353 |
| 2013/0282605 | A1* | 10/2013 | Noelting | G06Q 10/1053 |
| | | | | 705/321 |
| 2013/0290207 | A1* | 10/2013 | Bonmassar | G06Q 10/06 |
| | | | | 705/321 |
| 2014/0220540 | A1* | 8/2014 | Burgin | G09B 7/07 |
| | | | | 434/362 |
| 2014/0279631 | A1* | 9/2014 | Andersen | G06Q 10/1053 |
| | | | | 705/321 |
| 2015/0127567 | A1* | 5/2015 | Menon | G06Q 10/1053 |
| | | | | 705/321 |
| 2015/0206440 | A1* | 7/2015 | Aylesworth | G09B 5/00 |
| | | | | 434/362 |
| 2016/0055426 | A1* | 2/2016 | Aminzadeh | G06N 20/00 |
| | | | | 706/12 |
| 2018/0197428 | A1* | 7/2018 | Baphna | G09B 5/00 |

FOREIGN PATENT DOCUMENTS

| | | | | |
|---|---|---|---|---|
| WO | WO 2009055814 A1 * | 4/2009 | | G06N 5/02 |
| WO | WO-2009055814 A1 * | 4/2009 | | G06N 5/02 |
| WO | WO-2009149127 A1 * | 12/2009 | | G06Q 10/10 |
| WO | WO 2010054501 A1 * | 5/2010 | | G09Q 10/06 |
| WO | WO-2010054501 A1 * | 5/2010 | | G06Q 10/06 |
| WO | WO 2012112389 A1 * | 8/2012 | | G09B 7/08 |
| WO | WO-2012112389 A1 * | 8/2012 | | G09B 7/08 |
| WO | WO-2013165923 A1 * | 11/2013 | | G06Q 10/06398 |
| WO | WO2018085926 A1 | 5/2018 | | |

OTHER PUBLICATIONS

Duan, Songyun, Achille Fokoue, and Kavitha Srinivas. "One size does not fit all: Customizing ontology alignment using user feedback." International Semantic Web Conference. Springer, Berlin, Heidelberg, 2010. (Year: 2010).*

Bloedorn, Eric, and Inderjeet Mani. "Using NLP for machine learning of user profiles." Intelligent Data Analysis 2.1 (1998): 3-18 (Year: 1998).*

Bloedorn, Eric, Inderjeet Mani, and T. Richard MacMillan. "Representational issues in machine learning of user profiles." Proceedings of the Thirteenth National Conference on Artificial Intelligence and Eighth Innovative Applications of Artificial Intelligence Conference. 1996. (Year: 1996).*

"International Search Report" and "Written Opinion of the International Searching Authority," Patent Cooperation Treaty Application No. PCT/CA2017051326, dated Jan. 19, 2018, 8 pages.

* cited by examiner

John Smith

Add to shortlist... | Archive

Custom info
Reviews
Notes
Interactions
Engagement
Insights

Email Address
john@email.com

Shortlists
This member is part of the following shortlists:

Areas of Interest
• Engineering and Technology
• Mechanical

Areas of Expertise
• Equipment Maintenance
• Installation

Work Experience
Production Supervisor at Aerospace Corp.
2011 - 2015

Mechanic at Aviation Corp.
2010 - 2011

Top Work Styles
Analytical Thinking
Stress Tolerance   Dependability

Segments
This member is part of the following segments:
- Entrepreneurial
- Industry knowledge Links
No links listed Education
University of Aerospace

PROFICIENCY-BASED PROFILING SYSTEMS AND METHODS

FIELD OF THE INVENTION

The present technology is directed to proficiency-based profiling systems and methods that elicit information from individuals that is used to segment the individuals based on demonstrated proficiencies or traits in one or more unique subject matter domains. User profiles can be constructed using the elicited information and used to identify qualified candidates for an entity or opportunity.

SUMMARY

According to some embodiments, the present technology is directed to a method comprising: (a) generating an entity knowledge base for an entity, the entity knowledge base comprising descriptive information of the entity; (b) establishing a plurality of segments for the entity based on keywords or topics in the entity knowledge base, the plurality of segments relating to unique subject matter domains (such as general or specific knowledge, skills, experiences, traits and so forth); (c) eliciting information related to the plurality of segments using data reference structures generated from subject matter information; (d) receiving the elicited information from a plurality of individuals, answers to a series of proficiency questions (e.g., strengths, emphasis, or qualities) being indicative of a characteristic of an individual; and (e) building a profile for each of the plurality of individuals using the elicited information.

In some embodiments, the present disclosure is directed to a system of one or more computers which can be configured to perform particular operations or actions by virtue of having software, firmware, hardware, or a combination of them installed on the system that in operation causes or cause the system to perform the actions and/or method steps described herein. One or more computer programs can be configured to perform particular operations or actions by virtue of including instructions that, when executed by data processing apparatus, cause the apparatus to perform the actions. One general aspect includes actions such as (a) generating an entity knowledge base for an entity, the entity knowledge base comprising descriptive information of the entity; (b) establishing a plurality of segments for the entity based on keywords or topics in the entity knowledge base, the plurality of segments relating to unique subject matter domains; (c) providing a series of questions to a plurality of individuals, the series of questions related to the plurality of segments using data reference structures generated from subject matter information; (d) receiving answers to the series of questions from the plurality of individuals, the answers being indicative of a characteristic of an individual; (e) building a profile for each of the plurality of individuals using the elicited information; and (f) matching the profile to one or more opportunities of the entity so as to provide a qualified candidate to the entity that is based on demonstrated knowledge of the entity in one or more of the unique subject matter domains.

In another embodiment, the present disclosure comprises a system, including: (a) a data reference structuring server that: (i) obtains subject matter information for an entity, the subject matter information comprising descriptive information of the entity; and (ii) establishes a plurality of segments for the entity based on keywords or topics in the subject matter information, the plurality of segments relating to unique subject matter domains; (b) an engagement server that: (i) elicits information related to the plurality of segments using data reference structures generated from the subject matter information; and (ii) receives the elicited information from a plurality of individuals, answers to a series of proficiency questions being indicative of a characteristic of an individual; and (c) a segmentation server that builds a profile for each of the plurality of individuals using the elicited information.

Another example embodiment comprises: (a) generating an entity knowledge base for an entity, the entity knowledge base comprising descriptive information of the entity; (b) establishing a plurality of segments for the entity based on keywords or topics in the entity knowledge base, the plurality of segments relating to unique subject matter domains; (c) providing a plurality of individuals with an initial survey, the initial survey comprising questions directed to eliciting information that allows for placement of the plurality of individuals into one or more of the plurality of segments; (d) segmenting the plurality of individuals into one or more of the plurality of segments based on contributions in view of the questions in the initial survey; (e) eliciting information related to the plurality of segments using data reference structures generated from subject matter information, wherein the data reference structure comprises a framework that catalogs any of product, market and reactionary data; (f) receiving the elicited information from a plurality of individuals, which comprise answers to a series of behavior and proficiency questions that are indicative of a proficiency level of an individual; (g) updating the data reference structures using contributions to a series of proficiency questions; and (h) building a profile for each of the plurality of individuals using the answers to the initial survey, contributions, and the elicited information.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is generally directed to systems and methods that provide unique mechanisms for generating user profiles for individuals which are based on actual, demonstrated, and/or inferred proficiencies or traits, rather than information entered into a profile by the individual. The proficiencies or traits may comprise knowledge, interests, personality traits, behavioral traits, intelligence, sentiments, skills, cognitive abilities, aptitudes, attitudes, experiences, or other such criteria. For example, when an individual creates a user profile for themselves that includes a list of skills or experience, the individual may not be as proficient in all of these areas as they believe. Likewise, the individual may inadvertently fail to list experience or skills that are highly relevant. Also, some entities desire to learn about skills or experiences of individuals that are diverse, for example, some attributes of an individual that are relevant may not be directly related to a position and/or an entity.

These systems and methods can match these generated profiles to one or more opportunities of the entity so as to provide a qualified candidate to the entity that is based on demonstrated knowledge of the entity in one or more of the unique subject matter domains.

Some embodiments utilize machine learning to generate means for eliciting information from individuals that is indicative of their skills and experience. Other embodiments utilize questions generated from an entity knowledge base. The systems and methods can process the entity knowledge base to create what are referred to herein as data reference structures, which include highly relevant information types that refer to unique subject matter domains related to the entity. For example, a data reference structure can refer to engineering divisions of an entity that provide one or more types of engineering services. In other examples, social media input, market analyses, product catalogs, or other type of available information can be used to generate data describing capability, comparisons, sentiment, public reaction, weaknesses, etc. The data reference structures can be as granular as desired, based on the requirements of the entity.

In one or more embodiments, these systems and methods employ machine learning to refine the data reference structures using elicited information from individuals, as well as feedback from the entity.

Some embodiments are implemented within a discussion forum-like environment where individuals are profiled and segmented into sub-portions of the discussion forum based on shared characteristics. For example, a discussion board for an entity such as a car dealership could have sub-portions for various groups of people associated with the car dealership. There may be one sub-group for the sales department which includes discussions regarding sales techniques. There may be another sub-group for the repair department. There may be further sub-groups for loyal customers, potential buyers, or other people interested in a particular type of car (such as electric car, sports car, etc.). There may be further sub-groups for management and/or any other type of person with whom people of the car dealership communicate.

Figure 1A:
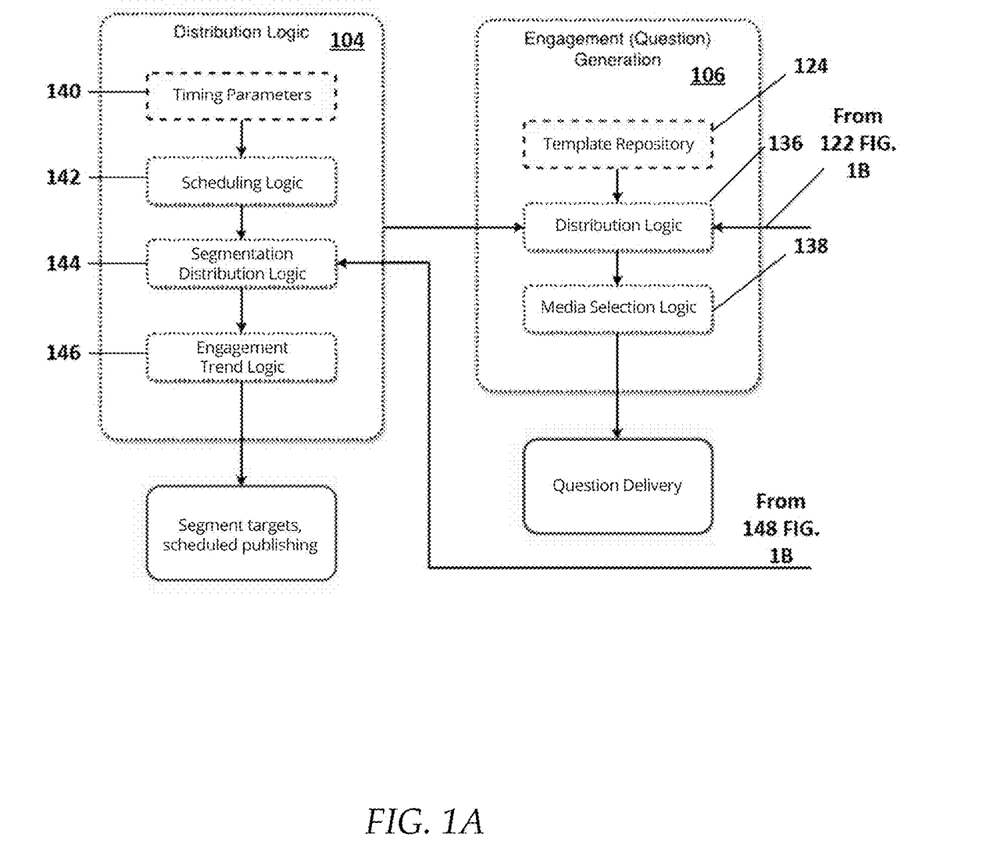
FIGS. 1A-C collectively illustrate a schematic diagram of an example system of the present disclosure.
Figure 1B:
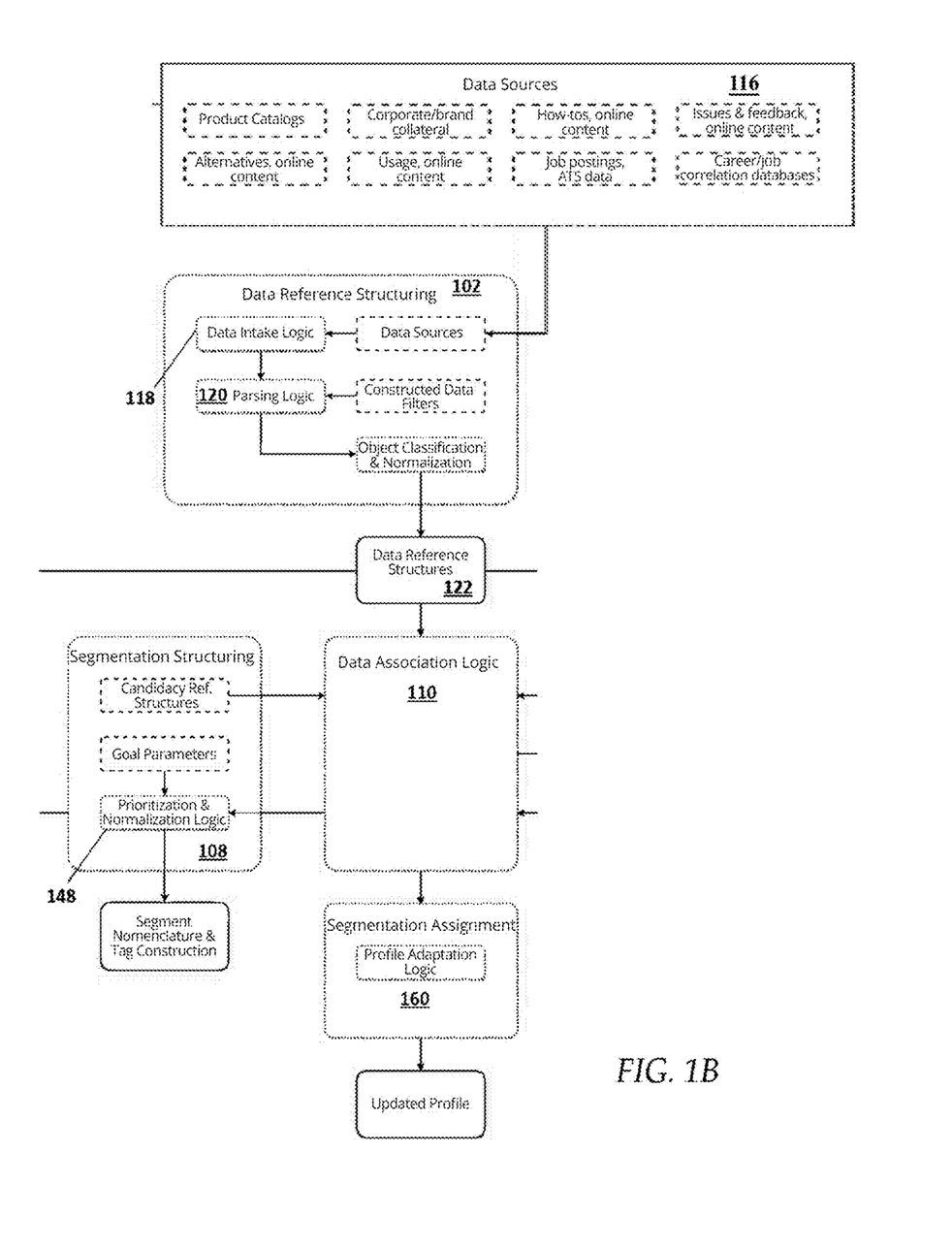
Figure 1C:
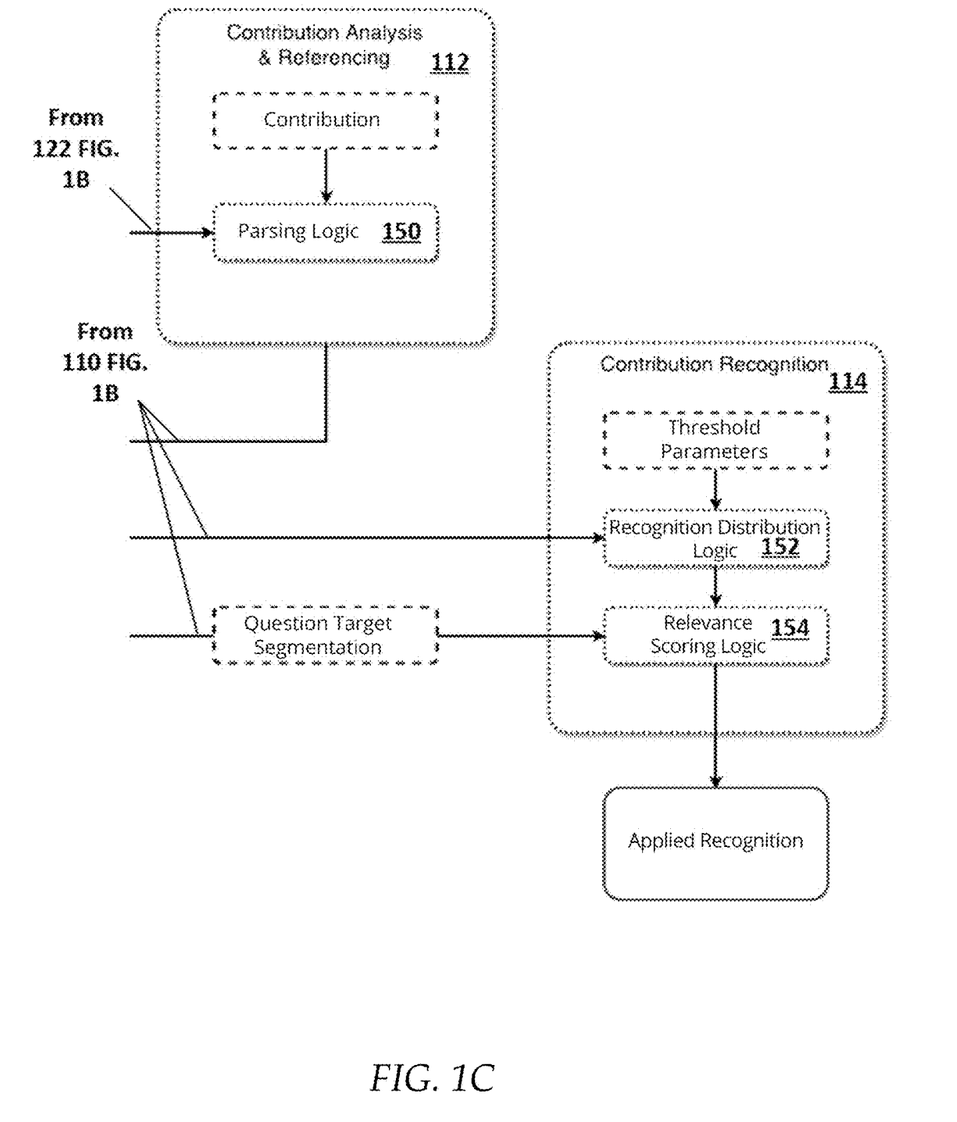

FIGS. 1A-C collectively illustrate a schematic diagram of an example system. The system comprises a data reference structuring server 102, a distribution logic server 104, an engagement generation server 106, a segmentation structuring server 108, a data association logic server 110, a contribution analysis and referencing server 112, and a contribution recognition server 114. The system can comprise additional or fewer components than those illustrated in FIGS. 1A-C.

For context, the questions and elicited information described in the various embodiments involve individual contribution through a discussion forum-like environment operated by an entity, although other platforms such as web-pages, dedicated applications, and social media can also be utilized. Regardless of the medium chosen, the system can build a knowledge base regarding the entity, collect information from individuals, automatically segment the individuals into groups using their provided information, as well as the knowledge base, and match the segmented individuals with opportunities based on objective and subjective information obtained from the individuals. The information is elicited by asking questions tailored to exposing specific characteristics, such as demonstrating proficiency with a desired skill, rather than (or in addition to) relying on purely subjective information provided by an individual through provision of a resume. Other attributes can be exposed through these methods such as personality traits, strengths, preferences, thought processes, opinions, and general (non-opportunity specific) knowledge and/or experience.

Thus, in some embodiments, in addition to the questions provided to the individuals, the system can provide individuals with an initial survey or other object that allows the system to gather baseline information that assists in initially segmenting the individuals. Stated otherwise, the initial survey comprises questions directed to eliciting information that allows for placement of the plurality of individuals into one or more of the plurality of segments.

For example, the individual can provide a resume or fill out a questionnaire that elicits basic information such as age, work history, education, certifications, and so forth. The individual is then subsequently provided with targeted questions, a profile is generated, and the individual is re-evaluated using the information obtained through the targeted questioning process and/or participation of the individual in the discussion forum. This process is similar to gathering information regarding the entity, so as to provide a baseline of information about the individuals. These are examples of data that can be gathered, but in general any data regarding actual, demonstrated, and/or inferred information about an individual can be obtained and utilized.

In one embodiment, the data reference structuring server 102 can receive entity information from a plurality of data sources 116. Example data sources 116 can comprise product catalogs, corporate/brand collateral, how-tos, online content, issues and feedback, alternatives, usage, job postings, and career and job correlation databases. These data sources provide a detailed understanding of the entity, the job needs of the entity, as well as products and services provided to customers of the entity.

The data reference structuring server 102 comprises a means for eliciting information from individuals (such as job applicants or candidates) and places individuals into unique subject matter domains. A unique subject matter domain can include any area of expertise, trait, characteristic, or any point of desired alignment between an individual and an opportunity, as discussed herein. For example, in an engineering company, a unique subject matter domain could include mechanical engineers, drafters, designers, and so forth.

In one embodiment, the data reference structuring server 102 is utilized to generate questions and deduce answers (i.e. contributions) to the generated questions. For questions regarding competency in a particular skill, the data reference structuring server 102 can deduce correct/incorrect answers. For questions regarding other traits or characteristics, the data reference structuring server 102 can deduce relevant information from the answer provided by a user individual. The contributions can be evaluated on utility and value to the reader, and alignment with the reference data structures. In this way, the embodiments described herein can utilize questions and answers to elicit information from the individuals and glean information about characteristics of those individuals.

Some embodiments of the data reference structuring server 102 comprise data intake logic 118 that receives the entity information from the data sources. Parsing logic 120 is then utilized to convert the entity information into an entity knowledge base, using data reference structures.

In one embodiment, the entity information is parsed using various data filters that examine the entity information for high value words or phrases that are indicative of goals or requirements for the entity. For example, the data filters can be tuned to parse for words related to specific opportunities (such as job profiles) or keywords for the entity.

The data reference structuring server 102 can employ object classification and normalization to generate data reference structures 122 that can be stored in a database. The data reference structures 122 provide a framework that catalogs product, market and reactionary data. The cataloged information may be used for later matching with specific opportunities or desired characteristics for an entity.

After the data reference structuring server 102 generates the questions, creates the data reference structures 122, and assesses a degree of alignment relative to the data reference structures and codified goals for the entity, the engagement generation server 106 can be employed to create a template repository 124, distribution logic 136, and media selection logic 138. The template repository 124 can generate templates that comprise questions arranged so as to solicit desired information from entities regarding a particular opportunity. The outcome or endpoint of the engagement generation server 106 is creation of logic that governs question delivery to individuals.

The distribution logic 136 is received from the distribution logic server 104, as will be discussed below. Generally, the distribution logic 136 will schedule questions for delivery to individuals. This scheduling of questions can be done in the time domain (when questions are published), using distributions (which individuals receive questions), and the topics that are covered in the distribution processes. The goal in one embodiment is to drive individual engagement with questions to elicit the best and most useful information for the entity. For example, the distribution logic 136 can be used to drive engagement with engineers, such that they will want to answer questions that are designed to elicit real-world experience from the individuals. The distribution logic 136 can implement engagement thresholds or other methods for ensuring that individuals answering questions are being asked the right number/type of questions to elicit the proper information for determining if the individuals meet the criteria required for a particular job description, and/or to maximize the data collected and its diversity. By way of example, the distribution logic 136 may be configured to require that an individual express at least five real-world experiences that indicate that the individual has depth of knowledge or skills in a particular subject area. The distribution logic 136 can also be utilized to organize and distribute the variety of data collected and how it is collected. In other words, the proficiencies required for the opportunity would be satisfied if the threshold of five real-world experiences in a given area were met or exceeded.

In one embodiment, the media selection logic 138 can be utilized to receive and/or evaluate media uploaded as a response to one or more questions. In some embodiments questions are produced with various media; the selection of appropriate art, graphics or video supplements the question and provides context and/or visual appeal.

The distribution logic server 104 is configured to create/identify segment targets and schedule publishing of questions by the engagement generation server 106. The distribution logic server 104 can generate any of timing parameters 140, scheduling logic 142, segmentation distribution logic 144, and engagement trend logic 146. The timing parameters 140 and scheduling logic 142 dictate when questions are published or distributed. The segmentation distribution logic 144 controls which segments of individuals (such as maintenance workers, engineers, managers, controllers, and so forth) receive questions relative to other segments.

The engagement trend logic 146 examines individual participation in response to questions and evaluates the responses to determine which questions are engaged with more or less relative to other questions. The engagement can be on a segment level. For example, the engagement trend logic 146 can be used to determine which questions are answered most often by engineers. The engagement trend logic 146 can use this information as the basis for driving interest in other topics or job categories/openings.

The data reference structures 122 can be utilized by various other portions of the system. For example, the data reference structures 122 can be utilized by the data association logic server 110 to determine matches between data reference structures and user profiles. In one embodiment, a segmentation assignment server 160 utilizes matching between data reference structures 122 and user profiles. The segmentation assignment server 160 provides profile adaptation logic to selectively adjust or update user profiles as the data reference structures 122 are updated over time. That is, as the knowledge base of the data reference structures 122 changes over time, the segmentation assignment server 160 can selectively update user profiles.

The data association logic server 110 will also provide the segmentation structuring server 108 with prioritization and normalization logic 148 that is inferred or otherwise determined from the data reference structures 122. The segmentation distribution logic 144 receives data from the prioritization and normalization logic 148 and the prioritization and normalization logic 148 creates segmentation schemas for delivering questions to individuals. For example, the basic structures of the data reference structures 122 are used as the basis for determining how to segment individuals. If the data reference structures 122 are indicative of engineering projects that require PE level engineers, this information can be used to segment PE level engineers from non-PE level engineers. Again, this can be accomplished, for example, using questions that are geared towards eliciting information that would be known to a PE level engineer.

The segmentation structuring server 108 also creates candidacy reference structures that reference departments in order to focus the elicited information or entity data. Goal parameters are also provided such as whether the entity is hiring or not for a given position or job description. The segmentation structuring server 108 generally creates the segment nomenclature and constructs tags than can be applied to an individual who answers questions. In the example above, a complex engineering question, if answered correctly, would result in the application of a PE engineer tag to the individual. The PE engineer tag is generated by the segmentation structuring server 108 from the data reference structures 122 evaluated by the data association logic server 110 for the entity.

After eliciting information from individuals and when responses or information is received, the elicited information is provided to the contribution analysis and referencing server 112. In one embodiment, the contribution analysis and referencing server 112 examines not only answers to questions, but also engagement of the individuals within their respective portions of the discussion forum. The contribution analysis and referencing server 112 can examine the interactions of the individuals with others and detect open-ended or valuable thoughts/contributions.

The contribution analysis and referencing server 112 comprises parsing logic 150 that evaluates information generated by an individual and deduces or infers main points of contribution of the individual.

The contribution recognition server 114 utilizes recognition distribution logic 152 and relevance scoring logic 154 to evaluate contributions of individuals in the discussion forum (or other participation medium). Individuals can be recognized for their contributions in order to reward actions and stimulate further participation. The contribution recognition server 114 can match an individual's information with existing data reference structures 122 to determine if the information provided by the individual is valuable or relevant. The contribution recognition server 114 can selectively choose a small percentage of contributions to recognize, such as 10-15 percent of all contributions. In various embodiments, a member's profile may have a value recognition component built into the questions distribution logic.

Figure 2:
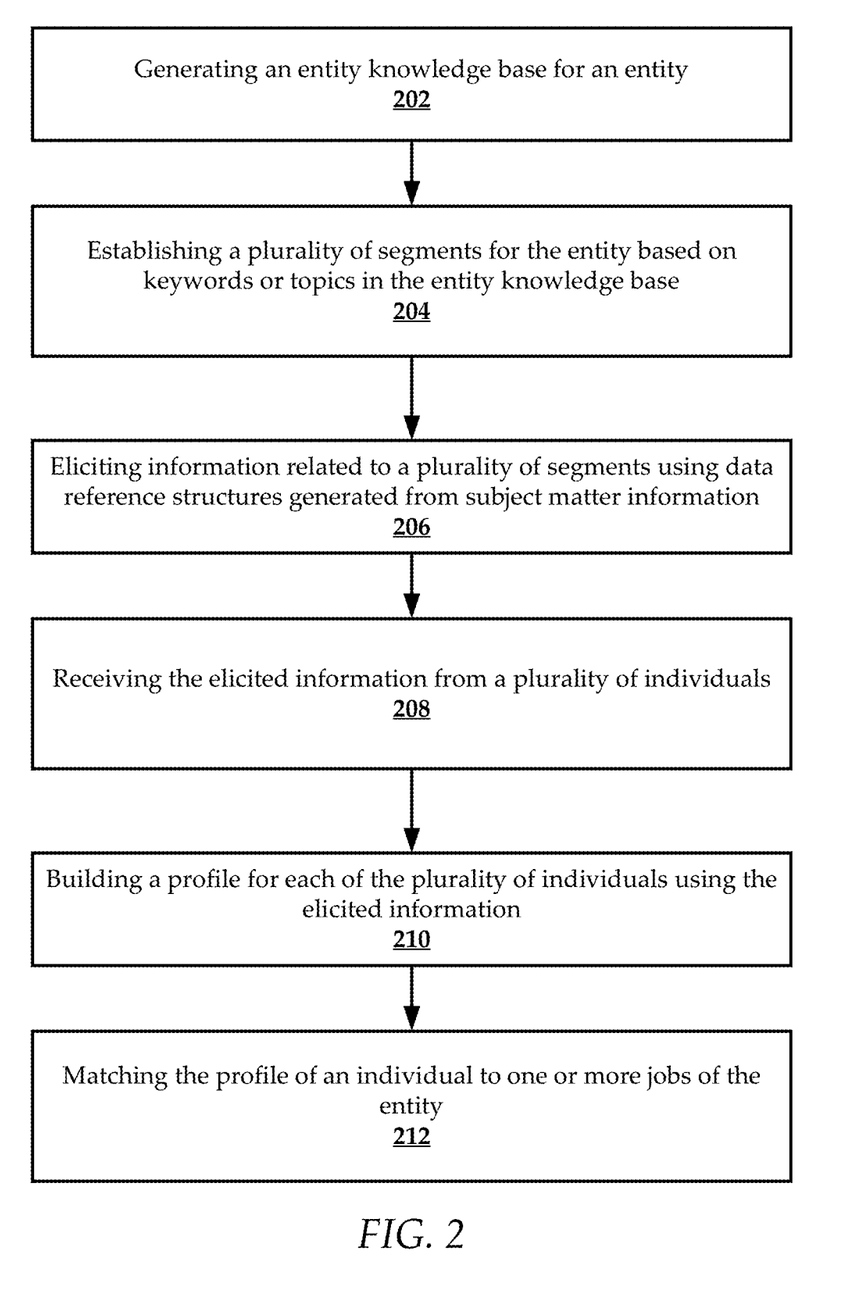
FIG. 2 is a flow chart of an example method of the present disclosure.

FIG. 2 is a flow diagram of an example method of the present disclosure. The method can include a step 202 of generating an entity knowledge base for an entity. Again, the entity knowledge base comprises descriptive information of the entity extracted from various data sources of the entity and/or third party data resources (both public and/or private).

The method may also comprise a step 204 of establishing a plurality of segments for the entity based on keywords or topics in the entity knowledge base. As mentioned above, the plurality of segments each relate to unique subject matter domains that are related to the entity. For example, the segments can include sales, marketing, management, human resources, and so forth.

Next, the method can include a step 206 of eliciting information related to a plurality of segments using data reference structures generated from subject matter information. The method includes using data reference structures (e.g., high level data profiles) that model the entity information. These data reference structures can be used as a template/framework for comparing against the proficiencies of the individuals in order to provide superior matching between entities and individuals for job placement, product sales, and/or other objectives.

In one embodiment, the method comprises a step 208 of receiving the elicited information from a plurality of individuals. Again, the answers are indicative of a proficiency level of an individual in the given segment to which they have been assigned. In other embodiments, the answers can be used to re-segment the individual based on their demonstrated proficiencies.

In one or more embodiments, the method includes a step 210 of building a profile for each of the plurality of individuals using the elicited information. The profile is generated with the demonstrated proficiencies as determined from answers to questions provided by the system or by interactions between individuals in the discussion forum, just to name some examples.

In some embodiments, the method includes a step 212 of matching the profile of an individual to one or more opportunity of the entity. The matching is done using the data reference structures created above. Thus, the data reference structures are used to generate segments for the entity, assign individuals to one or more segments, and match the individuals to opportunities or tasks available from the entity. The matching is executed in such a way as to provide a qualified candidate to the entity that is based on demonstrated knowledge of the entity in one or more of the unique subject matter domains (e.g., areas of proficiency).

Figure 3:
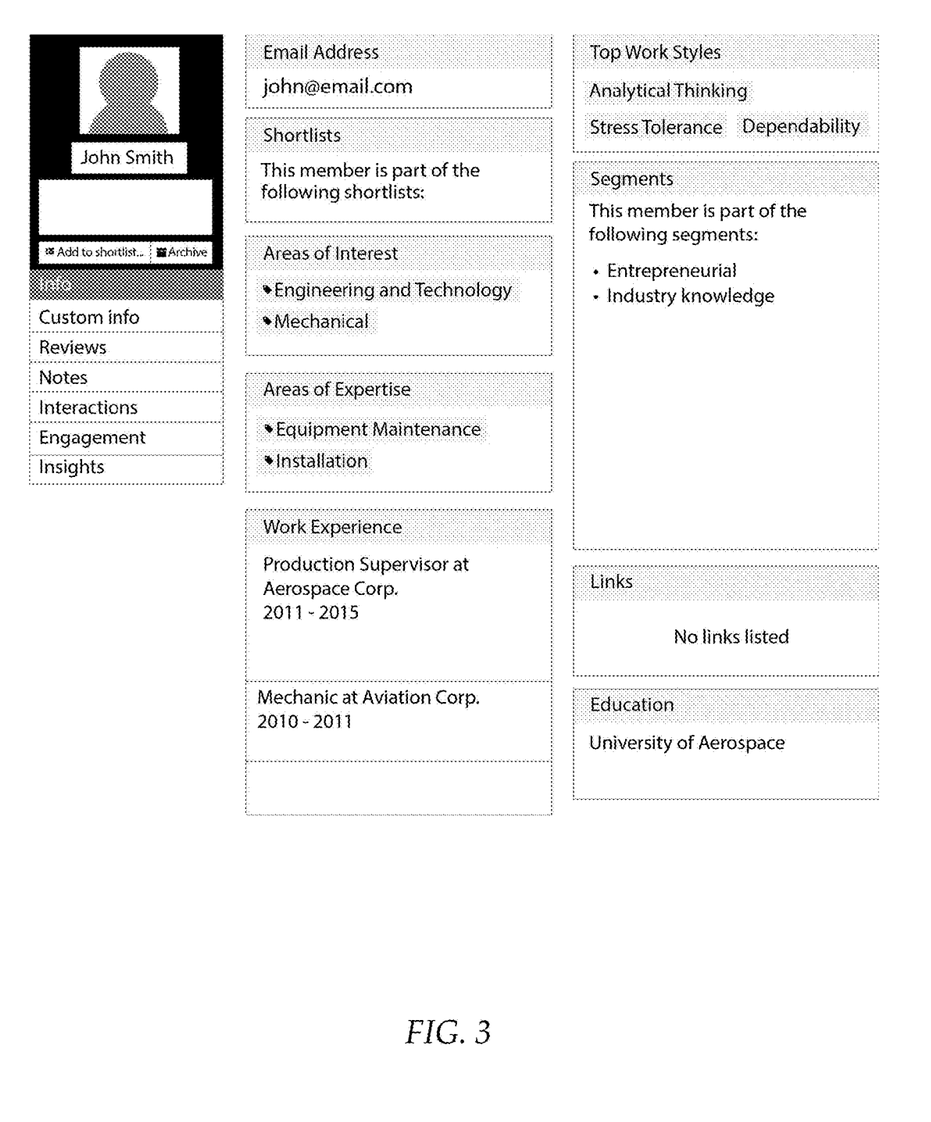
FIG. 3 is a screenshot of an example profile generated by methods and systems of the present disclosure.

FIG. 3 is a screenshot of an example profile generated for an individual using one or more aspects of the present disclosure. The screenshot comprises basic information for the individual such as email addresses, education, and work history. Additionally, the profile comprises areas of interest, areas of expertise, and segments. One or more of these informational categories (such as segments) are added to the profile by the system. As would be understood by persons of ordinary skill in the art, the exemplary profile of FIG. 3 is merely one example. In other embodiments, fewer or additional fields may be present in an individual profile.

Figure 4:
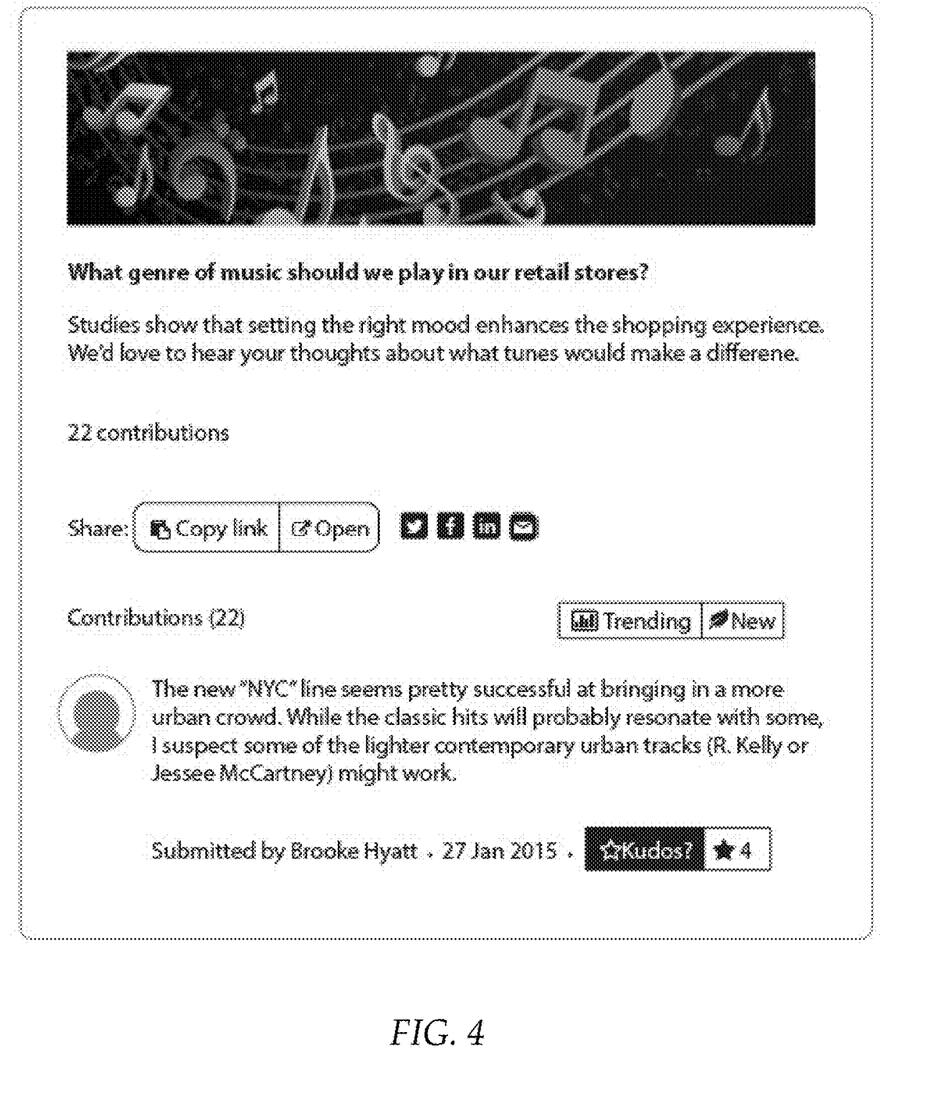
FIG. 4 is an example webform that illustrates the provision of a proficiency question and an answer thereto.

FIG. 4 is an example webform that comprises a question relating to music in a retail establishment. Answers (e.g., contributions) to the question are utilized to determine expertise and qualifications of individuals. As would be understood by persons of ordinary skill in the art, the exemplary webform of FIG. 4 is merely one example. In other embodiments, fewer or additional fields may be present in a webform.

Figure 5:
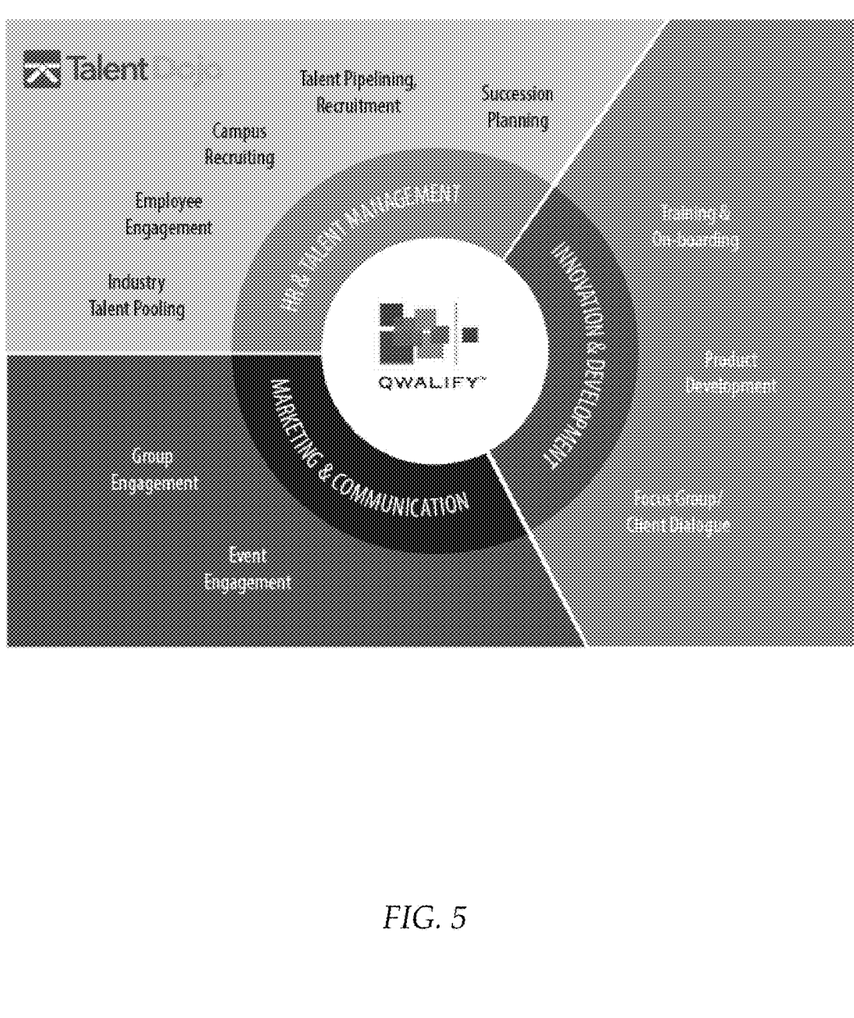
FIG. 5 is a graphical representation of various use cases that can utilize the present disclosure.

FIG. 5 is an example graphical illustration that represents the various entities and industries that can utilize the systems and methods of the present disclosure. The graph also illustrates various tasks that can be improved using the present technology such as campus recruiting, group engagement, product development, and so forth.

The teachings of the present disclosure can be readily adapted for use in a variety of manners. The following examples are non-limiting use cases for the systems and methods of the present disclosure. Each of these examples includes automated profiling. In each case, members are automatically assigned segments or tags based on their participation in the conversational technology disclosed above (e.g., question/contribution processes). Internal engagement, or employee engagement within an entity can be improved using the conversational technology where employees contribute and get their profile developed for promotion, succession planning and improved internal mobility from the corporate perspective.

In another example, focus groups can be improved whereby a company can engage participants in a more detailed manner and realize benefit from the contribution value provided by the engaged participants. Profiling of the engaged participants can also be realized by analyzing each participant's contributions. Such profiles for participants can be used for future opportunities.

In a further embodiment regarding pharmaceutical product sales and distribution, companies can use data reference structures of physicians and medical professionals to gather feedback and understand distribution and prescribing habits for specific drugs. The segmentation may be more around specialty product, personality trait, or any other characteristic that is desired to be tracked over time.

In an additional use case regarding educational institutions, a university can implement profiling to develop insights about prospective applicants to create a stronger relationship with the students and provide additional influence when it comes time to accept entry into top tier programs. In this way, a university can gain more information about applicants than is provided through a traditional application process. Similarly, applicants may also gain more in-depth information about the university than simply what is on its website, thus creating a stronger relationship between the student and university.

All of the above examples are merely additional example use cases that evidence the wide applicability of the systems and methods of the present disclosure to solve a vast number of problems in many industry verticals.

Figure 6:
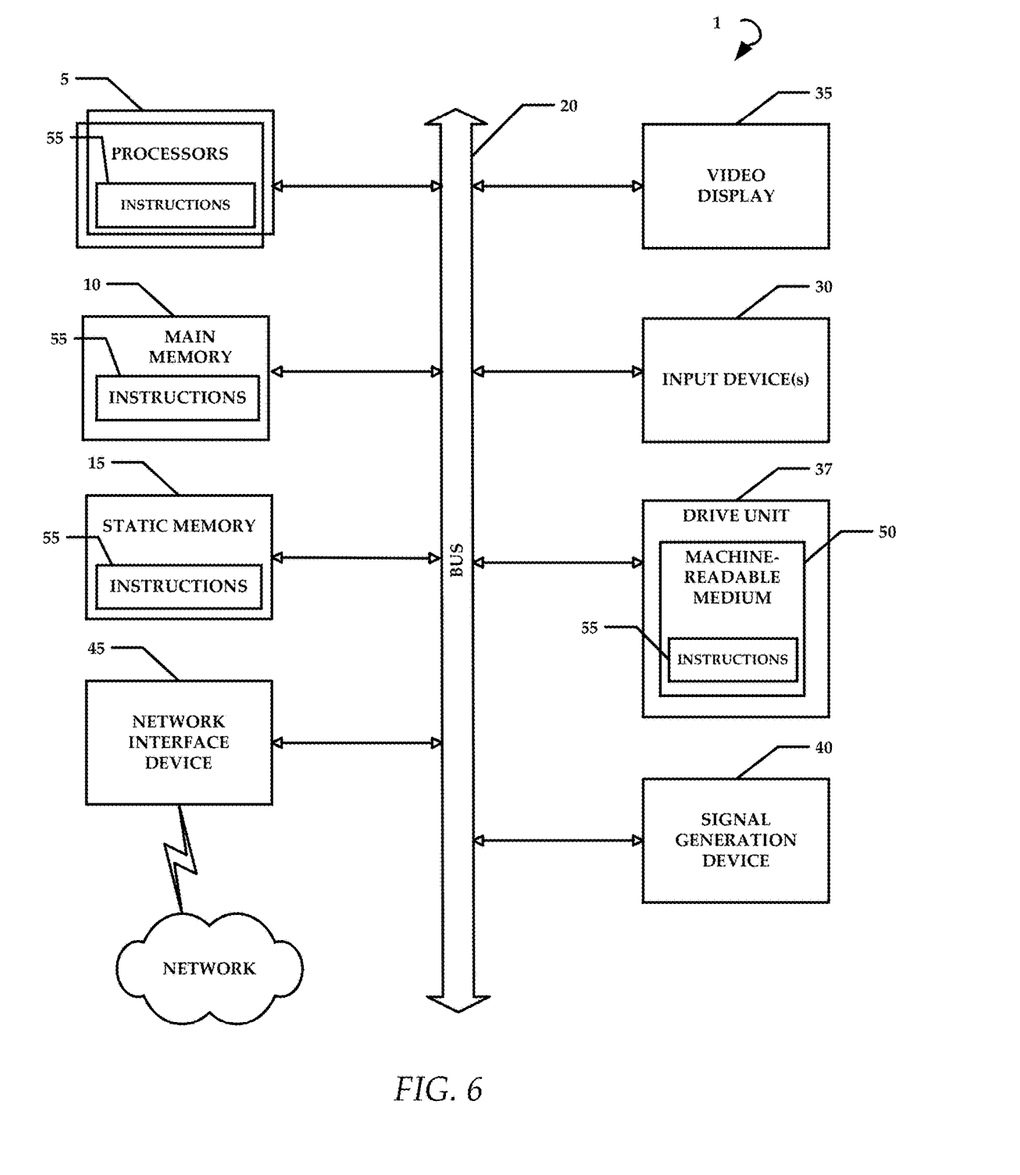
FIG. 6 is an example computing device that can be used to practice aspects of the present disclosure.

FIG. 6 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure. For example, the technology is not limited to use for stopping email threats, but applies to any messaging threats including email, social media, instant messaging, and chat.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A computer-implemented method performed by at least one processor for generating an automated profile of a user, the method comprising:
   receiving, via a data reference structuring server, descriptive information about an entity from a plurality of data sources, the descriptive information about the entity comprising information about
      products and services provided to customers of the entity; and
      at least one of: (i) goals of the entity or (ii) opportunities available at the entity;
   executing, via the data reference structuring server, parsing logic to generate an entity knowledge base for the entity from the descriptive information of the entity;
   establishing, via the data reference structuring server, a plurality of segments for the entity based on parsing keywords or topics in the entity knowledge base, the plurality of segments relating to unique subject matter domains of the entity;
   providing, via a distribution logic server, a plurality of individuals with an electronic first survey, the first survey comprising a plurality of questions directed to eliciting information that allows for placement of each of the plurality of individuals into one or more of the plurality of segments for the entity;
   segmenting, via a segmentation structuring server, the plurality of individuals into one or more of the plurality of segments based on electronic evaluation of each individual's answers to the questions in the first survey;
   for each of the plurality of segments, electronically eliciting, via the data referencing structuring server, information from a plurality of individuals in that segment using a series of questions including behavioral and proficiency questions in a second survey electronically generated from data reference structures, wherein the data reference structures comprise a framework that catalogs at least one of product data, market data and reactionary data related to each segment of the entity;
   receiving, via a contribution analysis and reference server, at least one answer to the elicited information from at least one individual of the plurality of individuals, the received answer to the series of questions being indicative of a proficiency level of an individual and behavioral characteristics of the individual;
      automatically constructing, via the data reference structuring server, the series of questions from the data reference structures;
   providing, via an engagement generation server, the series of questions from the second survey to the plurality of individuals according to a schedule, wherein the schedule is based on any of time between questions and quantity of questions in the second survey;
   automatically updating, via the data reference structuring server, the data reference structures using contributions to the series of questions;
   refining, via the data reference structuring server, the data reference structures through use of machine learning that uses answers to the elicited information from the plurality of individuals, as well as feedback from the entity;
   building, via a segmentation assignment server, a profile for each of the plurality of individuals using the answers to the first survey, answers to the elicited information, and a participation level of the individual based on a number of questions from the second survey for which answers were submitted; and
   updating, via the segmentation assignment server, the profile for each of the plurality of individuals based on subsequent answers received from each individual to questions in the second survey, or questions from a third survey.

2. The method according to claim 1, further comprising generating the data reference structures by:
   parsing the descriptive information obtained from the plurality of data sources for keywords, key phrases, or data instances related to the data reference structures that are indicative of the unique subject matter domains;
   applying data filters to the keywords; and
   classifying and normalizing the filtered keywords.

3. The method according to claim 1, further comprising assigning the data reference structures to the unique subject matter domains.

4. The method according to claim 1, further comprising:
   creating one or more discussion board groups on an electronic medium, each discussion board group being associated with one of the unique subject matter domains.

5. The method according to claim 4, further comprising presenting a series of proficiency questions in the one or more discussion board groups, the series of proficiency questions selected based on the unique subject matter domains.

6. The method according to claim 1, further comprising calculating an authority level for each of the plurality of individuals based on the answers to the series of proficiency questions.

7. The method according to claim 1, further comprising executing engagement logic to increase engagement in responding to the series of proficiency questions when participation of the plurality of individuals falls below an engagement threshold value.

8. The method according to claim 1, further comprising:
   establishing candidacy reference structures that comprise departments for the entity; and
   determining when goal parameters are present for each of the candidacy reference structures.

9. The method according to claim 1, further comprising determining a contribution level for each of the plurality of individuals based on the elicited information, wherein the contribution level is based on open-ended information provided by the plurality of individuals.

10. A system for automated profiling of an individual by an entity, the system comprising:
    a data reference structuring server that:
       executes data intake logic to receive descriptive information about an entity from a plurality of data sources, the descriptive information about the entity comprising information about:
          products and services provided to customers of the entity; and
          at least of (i) goals of the entity or (ii) opportunities available at the entity;
       executes parsing logic to convert the descriptive information about the entity into an entity knowledge base of information,
          wherein the parsing logic further generates data reference structures by:
             tuning data filters to parse for words or phrases indicative of goals or requirements of the entity;
             parsing the entity knowledge base using the tuned data filters; and employing object classification and normalization logic to generate the data reference structures from the parsed and filtered descriptive information about the entity,
    wherein the data reference structures provide a framework that catalogs product, market, and reactionary data about the entity;
generates a series of questions based on the data reference structures;
assesses a degree of alignment between the generated series of questions and at least one of:
    the automatically generated data reference structures, or
    the goals or requirements of the entity; and
updates the entity knowledge base and the data reference structures in response to electronically received answers to the series of questions, to refine subsequent questions generated;
a data association logic server that:
    executes segmentation distribution logic to create segmentation schemas for delivering the series of questions to a plurality of individuals, the segmentation schemas created based at least in part on the generated data reference structures;
a segmentation structuring server that:
    creates nomenclature for each segment of the entity and constructs tags that can be applied to each individual from the plurality of individuals that electronically submits an answer to at least one question of the series of questions electronically delivered to the plurality of individuals,
    the tags generated at least in part on the data reference structures;
an engagement generation server that:
    executes distribution logic received from a distribution logic server to
        schedule the series of questions generated by the data reference structuring server for electronic delivery to the plurality of individuals,
        where timing of the schedule is set to drive maximum engagement by the plurality of individuals with the series of questions to elicit maximally useful information for the entity;
        where the schedule further comprises:
            a list of the plurality of individuals to electronically receive the series of questions; and
            topics for the series of questions electronically delivered to the plurality of individuals; and
    organize and distribute collected answers from the plurality of individuals to the series of questions;
the distribution logic server that:
    creates or identifies target segments to receive the series of questions electronically generated;
    schedules publishing to an electronic medium of the series of questions from the engagement generation server; and
    executes engagement trend logic to examine a participation level by the plurality of individuals in submitting answers to the series of questions, to determine which questions of the series of questions are answered more frequently by the plurality of individuals;
a contribution analysis and reference server, that:
    electronically receives any answers to the at least one question of the series of questions from the plurality of individuals; and
    executes parsing logic to evaluate the received answer from each individual of the plurality of individuals to infer at least one main point of contribution of each individual to the entity; and
a segmentation assignment server that:
    automatically builds a user profile for each individual of the plurality of individuals using the received answers to the at least one question of the series of questions and tags associated with the received answers; and
    executes profile adaptation logic to selectively adjust or update each user profile as
        the data reference structures are updated over time,
        the questions generated by the data reference structuring server are updated over time, and
        answers are subsequently received from each individual.

11. The system according to claim 10, wherein the distribution logic server further:
    creates one or more electronic discussion board groups, each discussion board group associated with one or more segments of the entity; and
    publishes the series of questions to the one or more electronic discussion board groups, based on the segments of the entity.

12. The system according to claim 10, wherein the engagement generation server further schedules the series of questions to the plurality of individuals based on a quantity of questions previously delivered to the plurality of individuals.

13. The system according to claim 10, wherein the data reference structures are updated by the data reference structuring server based on the received answers to the series of questions.

14. The system according to claim 10, further comprising a contribution recognition server that utilizes recognition distribution logic and relevance scoring logic to evaluate the received answers from each of the plurality of individuals; and
    updates each user profile with a value recognition component based on results of the recognition distribution logic and the relevance scoring logic.

15. The system according to claim 10, wherein the distribution logic further: adjusts the schedule of the series of questions in accordance with an engagement threshold, to ensure that the series of questions electronically delivered to the plurality of individuals are of an optimal frequency and type of question to maximize an amount of information collected by the entity.

16. The system according to claim 10, wherein the engagement generation server further executes media selection logic to select relevant media to electronically deliver to the plurality of individuals with each of the series of questions.

17. The system according to claim 10, wherein the engagement generation server further executes media selection logic to receive and evaluate media electronically submitted by an individual of the plurality of individuals, in response to a question of the series of questions.

18. The system according to claim 10, wherein the engagement trend logic is executed separately for each segment of the entity.

19. The system according to claim 10, wherein the engagement trend logic is utilized to update the series of questions or the schedule of the series of questions.

20. The system according to claim 10, wherein at least one user profile is matched to at least one of the goals or requirements of the entity.

* * * * *